United States Patent [19]

Royle

[11] Patent Number: 5,549,431
[45] Date of Patent: Aug. 27, 1996

[54] TUBE SCREW FASTENER

[76] Inventor: Ian A. Royle, USA Technology 2000, 12503 Exchange Dr., Suite 536, Stafford, Tex. 77477

[21] Appl. No.: 367,738

[22] Filed: Jan. 3, 1995

[51] Int. Cl.⁶ ............................ F16B 23/00; F16B 35/00
[52] U.S. Cl. .................... 411/389; 411/395; 411/404; 411/418; 411/919; 81/460
[58] Field of Search .................................... 411/324, 395, 411/389, 402, 403, 404, 407, 919, 418; 606/65, 73; 81/460

[56] References Cited

U.S. PATENT DOCUMENTS

| | | |
|---|---|---|
| 4,462,283 | 7/1984 | Ito . |
| 4,681,494 | 7/1987 | Pratt . |
| 4,770,584 | 9/1988 | Vinciguerra ...................... 411/389 X |
| 4,856,953 | 8/1989 | Lin ...................................... 411/407 X |
| 5,064,323 | 11/1991 | Barnsdale . |
| 5,169,400 | 12/1992 | Muhling et al. ........................ 606/73 |
| 5,354,299 | 10/1994 | Coleman ................................. 606/73 |
| 5,443,509 | 8/1995 | Boucher et al. .................... 606/65 X |
| 5,456,685 | 10/1995 | Huebner ............................. 411/395 X |

Primary Examiner—Neill R. Wilson
Attorney, Agent, or Firm—Thomas A. Kahrl, Esq.

[57] ABSTRACT

A threaded tubular fastener having an elongated central through-bore having engaging means for engaging said through-bore with a rotary device having a rotary driver, a generally cylindrical body having an external surface with a main external thread formed thereon with a plurality of slots, said thread being larger than the diameter of a pre-drilled hole in a first work piece and a second mating work piece wherein the said threaded tubular fastener is employed to fasten the first work piece to the second work piece.

10 Claims, 2 Drawing Sheets

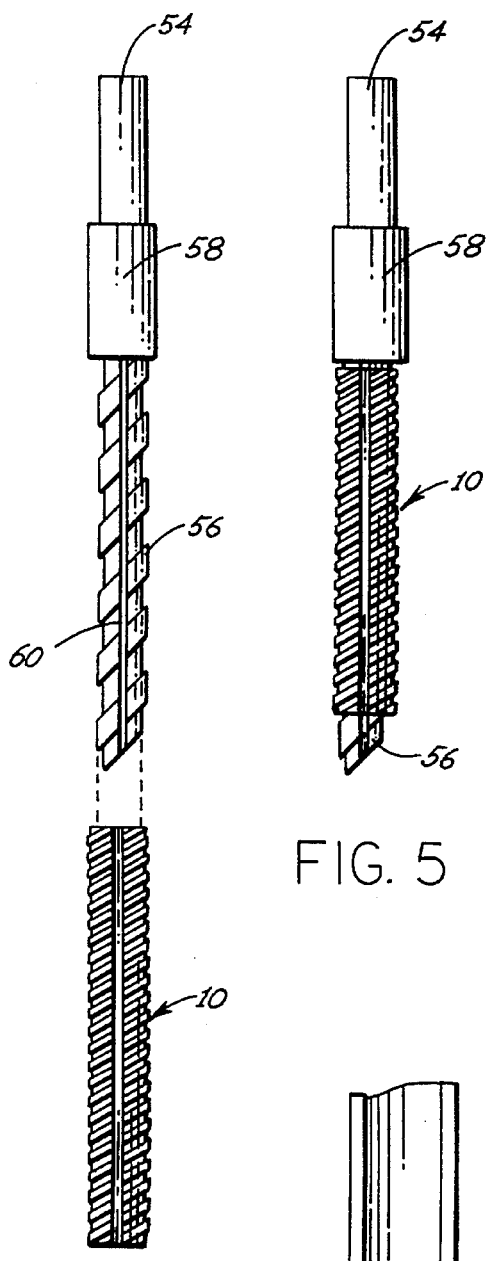
FIG. 4
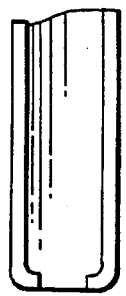
FIG. 5
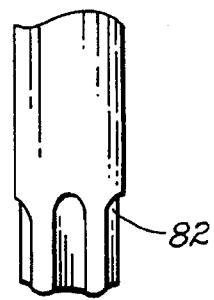
FIG. 6
FIG. 7
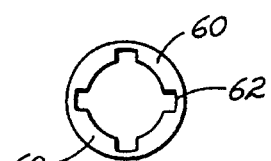
FIG. 8A
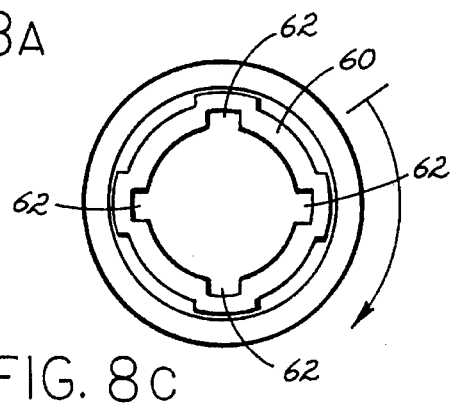
FIG. 8B    FIG. 8C

TUBE SCREW FASTENER

BACKGROUND OF THE INVENTION

The invention is directed to a threaded tubular fastener having an elongated central through-bore having an engaging apparatus for engaging said through-bore with a rotary device having a rotary driver, the fastener having a generally cylindrical body having an external thread form thereon, said thread being larger than the diameter of a pre-drilled hole in a first work piece and a second mating work piece wherein said threaded tubular fastener is employed to fasten the first work piece to the second work piece.

Fasteners for attaching a first work piece to a second work piece have recently become very expensive as a result of the demands for lightweight, high-strength fasteners sought by the construction and airline industry. Current requirements for fasteners put a premium on ease of installation, quality of installation of fasteners, combined with speed of application with associated reduction in cost of application.

Fastening systems traditionally have included a fastening device having a head, a driver for driving the head of the fastening device, and apertures in the structure members to be joined together. In particular, with respect to threaded tubular fasteners, the fastener typically includes a threaded portion which may be tapered or cylindrical, and an external head portion at one end adapted to receive a screwdriver. The head may be externally slotted, as with the slotted head of a conventional wood screw, or alternatively internally recessed, such as a recess for an Allen wrench; it may be single-slotted, such as the conventional screw, or multi-slotted, such as the Phillips screws, and all such heads of fasteners as installed, commonly protrude above the surface of the work piece.

PRIOR ART

Prior art drivers have typically included the traditional screwdriver with a single blade, a Phillips-head screwdriver having a pointed, X-shaped head, or an Allen wrench having an octagonal-shaped bar with a short portion and an elongated portion, either portion being adapted for use as a driver or a handle member. Prior art wood screws, traditionally, have tapered thread portions which are adapted, inserted and tapered apertures drilled in the structure member. In the event that the tapered aperture drilled in the structure member is too small for the threads of the wood screw, the wood screw will seize up part way in the hole, often resulting in scoring of the slotted head. In this situation the screw must be removed by special procedures as the head is destroyed, which is time-consuming, or alternatively is forced into position, leaving an imperfect and unsightly appearance. Furthermore, conventional slotted-head wood screws can only accept a limited amount of force applied to the driving head prior to failure of the driving head, this excluding their applicability in high-strength fastening applications. Also, wood screws having a solid cross section are relatively heavy, particularly when constructed of brass for use in corrosive environments, and are expensive due to the cost of brass material.

Furthermore, all fasteners having an external head suffer a difficulty in that the head is left exposed and protruding upon completion of driving the fastener in place. In order to conceal such fasteners, it is necessary to countersink the aperture to accept the external head in a recess and to provide a plug device superimposed over the external head to conceal it from view. Such countersinking and plugging is time consuming and expensive and very often yields an unsatisfactory exterior appearance.

The Phillips-head fastener was one element of a fastening system originally designed for high-speed production techniques in applications with associated Phillips power drivers. The X-shaped, pointed head provided for ease of location of the driver in the fastener head and provided greater force to be applied to the fastener. While Phillips-head drivers permitted increased speed of application by providing a larger contact area on the head for the applying force of the driver, it was common, once the fastener seated, for the head to slip and strip the cross-slotted head making removal of the fastener difficult, if not impossible. The alternative Allen fastening system was developed for providing greater force-applying means to the driving head by providing a recessed socket for accepting a multi-faceted rod, typically having an octagonal shape. The Allen threading fastening system is typically used in metallic applications such as lock nuts or key systems. The Allen fasteners, in a solid cross section, were typically for machine threads which are expensive to produce and conventionally have not been used in the construction industry due to their cost of manufacture and due to the fact that they require greater time in the application.

U.S. PATENTS

Applicant is aware of U.S. Pat. No. 4,462,283 issued on Jul. 31, 1984 for a screw driver apparatus for screwing a threaded fastener into an internally threaded member having a casing form from a through-bore to receive the threaded fastener said being patented to Ito. Unlike applicants device, Ito does not include an internal engaging device formed on the walls of the fastener. Applicant is also aware of U.S. Pat. No. 4,681,494 to Pratt et. al., issued on Jul. 21, 1987 covering a drive-nut blend fastener with cap nut covering a blind fastener for connecting two work pieces together comprising an internally threaded fastener body and an externally threaded stem passing in the threaded engagement therewith. Unlike applicant's device, the Pratt fastener is driven from one end in conventional blind fastener fashion. Another U.S. Pat. No. 5,064,323 issued to Barnsdale, Nov. 12, 1991 covers a threaded fastener or insert having a generally cylindrical body and about the body is formed the thread. There is provided two sets of flutes formed in the thread extending axially of the body. One of these threads extends deeper into the thread than the other set. Unlike applicants device, the Barnsdale device is directed to a self-threading fastener having flutes formed in the thread for use in self-threading into work pieces. Applicant's device is configured to be threaded into apertures provided in one or more work pieces. Provision for a total of six flutes in the Barnsdale device provides increased thread cutting effectiveness while not substantially diminishing the pull-out resistance of the device.

Accordingly, it is an object of this invention to provide a stronger, lighter, neater, more adaptable fastening device for fastening a plurality of work pieces together and to provide a much quicker and more accurate system of fastening. It is another object of the invention to provide an inexpensive sheet metal formed fastener of corrosion resistant alloys adapted to accept greater driving pressure due to the driving connection being made the entire length of the fastener to provide a high-strength fastener. It is another object of the invention to provide a fastening device which provides for flush mounting and avoids the necessity of countersinking the fastener aperture, thereby, saving time and expense. It is the further object of the invention to provide a thin, tubular shell for the fastener, being kept thin by using high-strength materials and providing for internal driving grooves running from top to bottom of the fastener.

Another object of the invention is to provide an exterior thread having two pitches, having a rolled thread or a cut thread, or alternatively a self-tapping thread for drawing the two work pieces together.

It is yet, a further object of the invention to provide a parallel aperture having parallel walls using a standard drill bit or alternatively a specially designed drill driver, or alternatively a special tubular driver that removes the wood chip. A further object of the invention is to provide a rotary driver that has positive drive locking grooves over the full length of the stem of the rotary driver to engage the associated full length, full depth grooves of the screw. A further object of the invention is to eliminate an external head having slot, cross or hexagonal drive problems. It is a further object of the invention to provide a full depth internal drive for providing control-positive alignment of the fastening device. A further object of the invention is to provide an accurate hole to fit decorative plugs or caps without having a counter-bored hole. A further object of the invention is to permit use of an adhesive after assembly to be inserted through the through-bore in the tube fastener. A further object of the invention is to provide an opening for access of wiring. It is a further object of the invention to provide a smaller diameter tube fastener for the same strength of the same force loading, wherein the weight of the screw is approximately 20% less than the conventional screw fastener resulting in savings in manufacturing and in material costs. It is a further object of the invention to provide a high technology appearance to apparatus employing the fastening devices.

Accordingly, it is desirable to provide for a new and improved blind fastener and fastening system to provide for lightweight, high-strength and high-quality fasteners which overcome at least some of the disadvantages of prior art fasteners and systems.

SUMMARY OF THE INVENTION

The invention relates to a threaded tubular fastener apparatus and fastener system and method for screwing a hollow, headless tubular fastener for connecting two work pieces together. As installed, the headless tubular fastener is flush-mounted with the exterior surface of the work pieces for an enhanced appearance. The threaded tubular fastening apparatus includes a hollow tubular fastener member, a rotary driver having a shank, including an axial interconnecting means for interconnecting the threaded tubular fastener and the driving means for driving the tubular fastener into aligned openings in two work pieces for connecting the work pieces.

The tubular fastener is adapted for mounting in aligned openings pre-drilled in two work pieces, typically aligned in parallel relationship for connecting the work pieces together. The openings are drilled with a conventional drill to provide for parallel walls. Tubular fasteners of cylindrical construction having a hollow casing such that the exterior wall of the tubular fastener is parallel with the walls of the openings. The tubular fastener includes an external thread provided on the tubular exterior of the tubular casing and includes external longitudinal slots and associated internal longitudinal ribs extending the entire length of the fastener, wherein the threads in the preferred embodiment are formed as rolled threads. Alternatively, the threads could be formed as cut threads. Tubular fasteners provided with a through bore extending the entire length of the fastener to provide a hollow opening to permit the rotary driver to pass reciprocally through the tubular fastener to engage substantially the entire length of the internal slots.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 4 is a longitudinal sectional view of the tubular fastener of FIG. 1 in combination with a dual bit & driver bit of an alternate embodiment.

FIG. 5 is a sectional view of an alternate embodiment of the present invention showing a self-tapping end device.

FIG. 6 is a sectional view of a third alternate embodiment adapted to be driven by a Phillips-head driver.

FIG. 7 is an side view of a fourth embodiment.

FIG. 8a is a sectional view of a fifth embodiment of the present invention having a flared top with protrusions.

FIG. 8b is an end view of FIG. 8a; and

FIG. 8c is an enlarged view of FIG. 8b.

DETAILED DESCRIPTION OF THE PREFERRED EMBODIMENT

Figure 1:
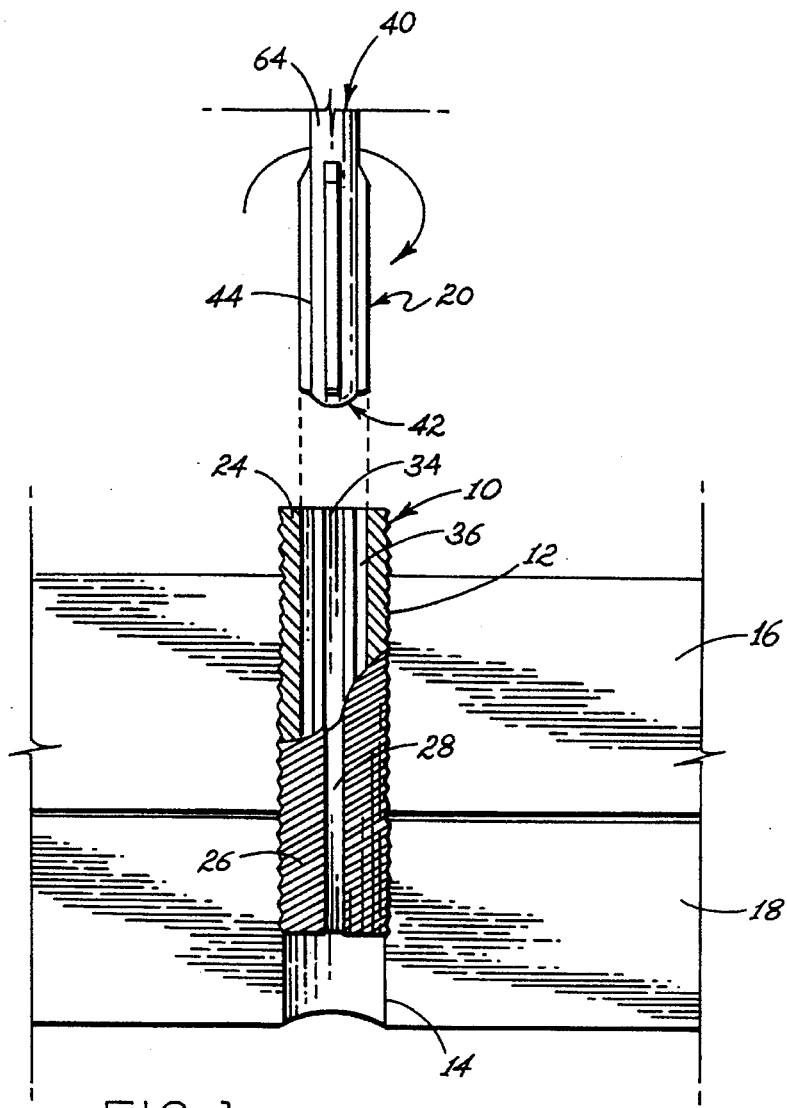
FIG. 1 is a side elevational view of the threaded tubular fastener shown in partial section and rotary driver of the present invention.
Figure 2:
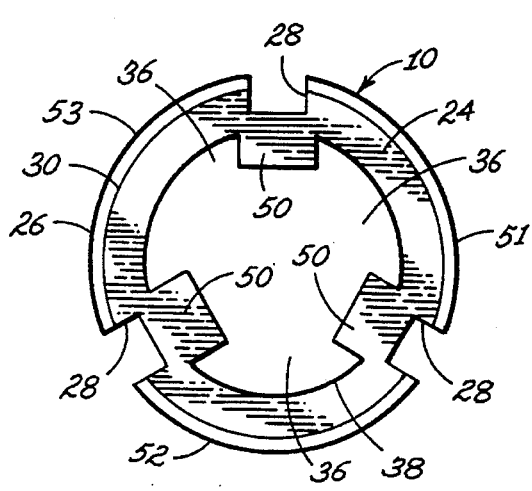
FIG. 2 is a cross sectional view of a tubular fastener of FIG. 1 illustrating the tubular fastener in a set condition in a first and second work piece.
Figure 3:
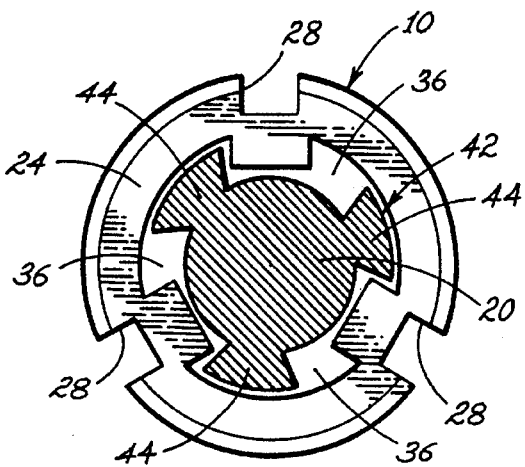
FIG. 3 is an end view of the tubular fastener illustrated in FIG. 1.

Referring to the FIGS. 1–3 there is shown a threaded tubular fastener 10 for mounting in aligned apertures 12 & 14 in two work pieces 16 & 18 for connecting said work pieces in combination with a driver 20 configured to impart torque to said fastener. In particular the preferred embodiment is directed to a tubular fastener 10 for fastening a first work piece to a second work piece comprising a body 24 of tubular construction having a segmented thread 26 with a plurality of axial flutes 28 formed on the external surface 30 of said body. Preferably the threads are formed as rolled threads to be received in openings 12 & 14 in the work pieces 16 & 18 preformed in said work pieces by a drill device 32 shown in FIGS. 4 & 5 or as predrilled by cutting edge 19 shown in FIG. 6.

In the preferred embodiment the threaded tubular fastener 10 includes a central through-bore 34 having a plurality of axial slots 36 formed in an inner wall 38 of said through-bore. The tubular fastener cooperates with manually operated rotary driver 20 for manually threading said fastener into apertures of the first and second work pieces 16 & 18 which are adapted to transfer a substantial amount of force, without deformation in the threading of the tubular body 24, into the apertured work members 16 & 18. Said rotary driver includes a first end and a second end and includes a manual torque applying device 40 at the one end and an interengaging device 42 at the other end consisting of a plurality of axial ribs 44 for engagement with the axial slots 36 positioned in body 24 between internal ribs 50. Said through-bore 34 is adapted to permit the driver 20 to pass reciprocally through the threaded tubular fastener 10 to engage substantially the entire length of the internal ribs 50 for turning said tubular fastener in two axial directions; a first direction for threading tubular fastener 10 into aligned openings 12 & 14, the second for backing said tubular fastener out of said openings.

In the preferred embodiment, the fastener 10 is adapted to be set by driver 20, said fastener consisting of an externally threaded tubular body 24 constructed of tubular casing threads 26 being formed as rolled threads to be received in apertures 12 & 14 and work pieces 16 & 18. The threads are formed as segmented threads 26 including a first thread section 51, a second thread section 52 and a third thread section 53. Driver 20 is configured to be manually operated in the preferred embodiment to transfer a substantial amount of force through interengagement of axial ribs 44 and internal ribs 50 for driving fastener 10 into apertures 12 & 14 without deformation in segmented thread 26 of tubular body 24. Driver 20 has a first end and a second end.

In an alternate embodiment shown in FIGS. 4 & 5, the casing of tubular body 24 consists of an inner and outer surface having a threaded outer surface 30 adapted to be driven by a power driver 54 for rotary threading said fastener 10 having an inner drill driver 56 including a journal 58 for engaging the internal ribs 50 of said fastener 10. In this embodiment, the inner drill driver 56 is provided with projections 60 which correspond to the axial ribs 44 of the manual driver as shown in FIG. 1.

Referring to FIG. 1, an advantage of the preferred embodiment is that internal passageways provided by the through-bore 34 of tubular body 24 provide a conduit for providing a passageway for wires or control elements to pass through work pieces 16 & 17.

In a further alternate embodiment, as shown in FIG. 7 a protrusion may be deformably driven by an anvil to form into a wall and extend outwardly for engagement therewith.

The preferred embodiment further includes a fastener system wherein interengagment means for interconnecting the axial ribs 44 of the driver 20 with the fastener for imparting axial rotation of the tubular body 24 having a plurality of slots 36 for receiving torque applying means 40 having an interengagement means device 42 and upon urging of the torque applying means 44 into engagement with the axial slots 44 of the said fastener to force said fastener into engagement with work pieces 16 & 18 so as to cause the engagement of said two work pieces.

In a further embodiment, as is shown in FIGS. 8A, 8B & 8C the tubular body 24 is provided with a flared top 60 wherein the driver 20 shown in FIG. 1 comprises a plurality of ribs 44 located at the leading end of said shaft with said ribs extending axially outwardly wherein the tubular body 24 has an internal bore and an external slot end portion 82 shown in FIG. 7 portion 82 at one end with driving means for driving said tubular body comprising external protrusions on the anvil end of the driver 20 for engaging protrusions 82 extending inwardly on the internal cylindrical wall of the tubular body to impart an insertion force to the fastener wherein the anvil is rotated in a clockwise direction. In this embodiment, the drive shaft 64 includes slots 94 adapted for engaging the protrusion 82 for internally driving said fastener.

What is claimed is:

1. A threaded tubular fastener in combination with a rotary driver device configured to impart torque to said fastener comprising:
    a) a tubular fastener comprising;
        i) a generally cylindrical body having an external surface with a main external thread formed thereon with a plurality of external axial flutes;
        ii) an elongated central through-bore; an
        iii) engaging means for engaging said rotary driver positioned in said through-bore comprising a plurality of internal axial slots;
    b) rotary driver means for threading said tubular fastener into apertures of a first work piece and second work piece-bore comprising:
        i) a torque applying means at one end; and
        ii) an interengaging means at an other end comprising a plurality of axial ribs for engagement with said internal axial slots, wherein the said threaded tubular fastener is employed to fasten the first work piece to the second work piece.

2. The tubular fastener of claim 1 wherein said external thread is larger than the diameter of a pre-drilled hole provided in a first work piece and a second mating work piece.

3. The tubular fastener of claim 1 wherein the rotary driver means comprises a journal for threading the tubular fastener into engagement with the apertures of the work pieces comprising a journaled surface having projections.

4. The tubular fastener of claim 3 wherein the tubular said body comprises a segmented thread having a plurality of axial flutes formed on the external surface of said body, the threads being formed as rolled threads to be received in openings in the work pieces.

5. The tubular fastener of claim 4 wherein the tubular fastener is configured for engaging aligned openings in two work pieces for connecting said work pieces.

6. The tubular fastener of claim 5 wherein said body consists of a tubular casing comprising an inner and outer surface having a threaded outer surface.

7. The apparatus of claim 6 wherein said central through-bore provides internal passageways for conduit.

8. The threaded tubular fastener of claim 7 wherein the tubular body consists of a tubular casing comprising an inner and outer surface having a threaded outer surface and comprise a central through-bore having at least three internal axial slots formed in an inner wall of said through-bore adapted to co-operate with the at least three axial ribs for engagement with said axial slots.

9. The threaded tubular fastener of claim 1 wherein said rotary driving means is configured for threading said tubular fastener into pre-drilled apertures of the first and second work piece adapted to transfer a substantial amount of force without deformation of the tubular body.

10. The threaded tubular fastener of claim 1 wherein said interengaging means comprising a plurality of axial ribs for engagement with said internal axial slots wherein said through-bore is adapted to permit the rotary driver means to pass reciprocally through said body to engage substantially the entire length of the internal axial slots for turning the tubular fastener in two axial directions, a first direction for threading the tubular fastener into aligned openings, the second for backing said tubular fastener out of said openings.

\* \* \* \* \*